Feb. 28, 1939.  A. F. WELCH  2,149,108

CENTRIFUGAL SWITCH

Filed May 25, 1937

Inventor:
Alfred F. Welch,
by Harry E. Dunham
His Attorney.

Patented Feb. 28, 1939

2,149,108

UNITED STATES PATENT OFFICE 2,149,108

CENTRIFUGAL SWITCH

Alfred F. Welch, Fort Wayne, Ind., assignor to General Electric Company, a corporation of New York Application May 25, 1937, Serial No. 144,667

5 Claims. (Cl. 200—80)

My invention relates to centrifugal switches such, for example, as those used in dynamo-electric machines for controlling the circuits of starting windings.

An object of my invention is to provide an improved centrifugal switch which is simple in construction, reliable in operation, and which can be readily manufactured.

Further objects and advantages of my invention will become apparent, and my invention will be better understood, from the following description referring to the accompanying drawing, and the features of novelty which characterize my invention will be pointed out with particularity in the claims annexed to and forming part of this specification.

Figure 1:
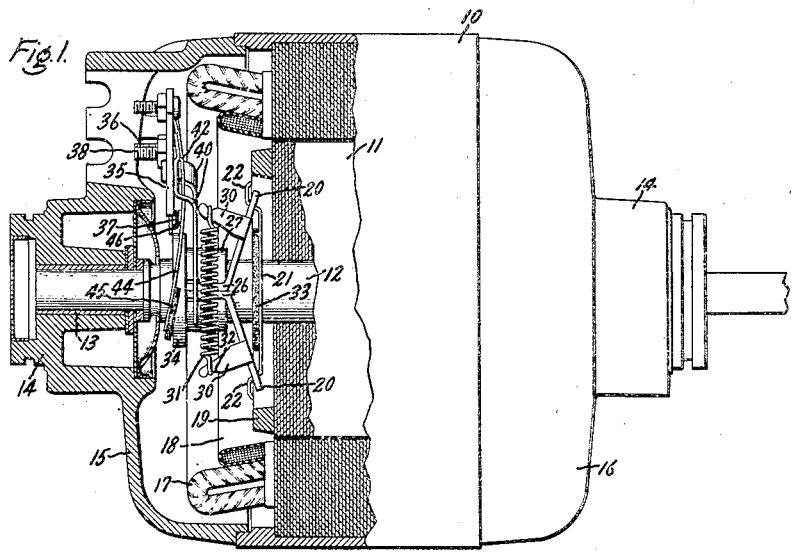
Figure 2:
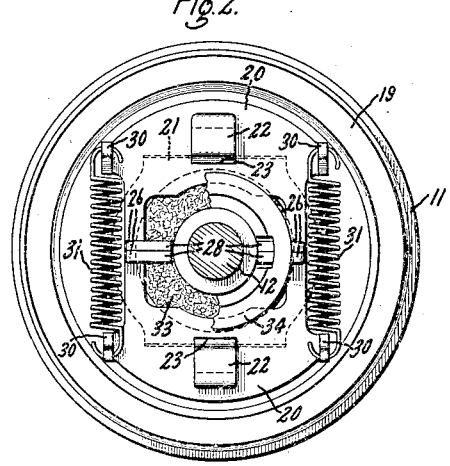
Figure 3:
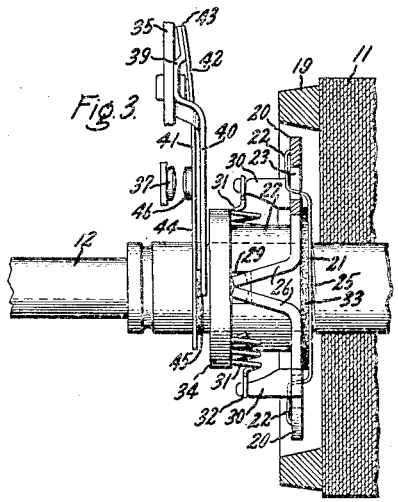
Figure 4:
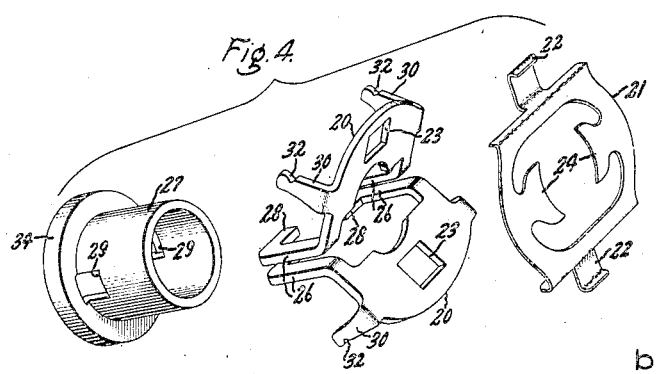

For a better understanding of my invention, reference is made to the accompanying drawing wherein Fig. 1 is a partial sectional side elevational view of a dynamo-electric machine embodying my invention; Fig. 2 is an end view of the centrifugal mechanism and rotatable member of the motor shown in Fig. 1 with a part of the centrifugal mechanism broken away; Fig. 3 is an enlarged fragmentary side elevation of the switch and associated parts of the centrifugal mechanism and motor; Fig. 4 is an exploded perspective view of a collar, weights, and resilient retainer disk of the centrifugal mechanism.

Referring to the drawings, I have shown a dynamo-electric machine having a stationary member 10 and a rotatable member 11 mounted on a shaft 12, the ends of which are journalled in bearings 13 supported in hubs 14 formed on the end shields 15 and 16 of the stationary member. The dynamo-electric machine shown is a single phase induction motor, and excitation is provided by a single phase main field exciting winding 17 and a starting field exciting winding 18, the rotatable member being provided with a cast squirrel-cage winding 19.

In this type of induction motor, it is desirable that the starting field exciting winding should be energized during the period when the motor starts to operate, or under such operating conditions that the speed of the motor is reduced beyond a predetermined value, and that it is deenergized when the speed of the motor exceeds a predetermined limit. In order to accomplish this, I provide a centrifugal switch having electrical contacts connected to the energizing circuit of the starting field exciting winding 18.

The centrifugal mechanism of the switch includes a pair of outwardly movable weights 20 arranged eccentrically of the axis of the shaft 12 and extending transversely of the shaft. These weights are secured to the shaft by a resilient bronze spring retainer disk 21 provided with a pair of outwardly extending ears or portions 22 slidably engaging slots 23 formed in the weights 20. In order to securely mount the device against axial displacement, the resilient disk 21 is provided with a pair of inwardly extending fingers 24 pressed on the shaft 12 and engaging grooves 25 formed thereon. Each of the weights 20 is a fabricated unitary sheet metal stamping provided with a pair of rigid arms 26 extending angularly therefrom at an angle of approximately 120°, one on each side thereof, for controlling the operation of an axially movable member or collar 27 slidably arranged on the shaft 12. These arms 26 are provided with inwardly extending projections 28 at the ends thereof which are pivotally connected to the collar 27 by slidably and pivotally engaging slots or recesses 29 formed in the collar 27. This collar preferably is made of electric insulating material, such as a heat hardened phenolic condensation product with a suitable filler material. The weights 20 also are formed with rigid fingers 30 extending angularly from each side of the weights at about 90° and spaced from the arms 26, which provide connections for resiliently biasing the weights inwardly towards the shaft by a pair of tension springs 31 arranged on opposite sides of the shaft 12. The opposite ends of each spring respectively engage notches 32 formed in the ends of the fingers 30 on adjacent sides of the two weights 20. These springs are arranged so that the inward position of the weights shown in Fig. 1, when they are rotating, provides a greater leverage for the spring force acting upon the weights, than the outward position of these weights, shown in Fig. 3, when the centrifugal mechanism is operating at a predetermined speed. This gives the mechanism a snap action when the motor comes up to speed. As the weights 20 move outwardly, the spring leverage decreases due to the angular movement of the weights with respect to their pivotal connection of the collar 27, so that when a predetermined motor speed is reached, a further increase in speed is not necessary in order to produce a further rapid outward movement of the centrifugal weights. A washer 33, made of felt or similar material, is arranged about the shaft 12 adjacent the resilient disk 21 to provide a cushion between the disk 21 and the weights 20.

The collar 27 is provided with an annular flange 34 arranged to control the engagement and disengagement of a set of electrical contacts of a switch in the circuit of a starting winding 18. This switch comprises a support 35 of electric insulating material secured to the end shield 15 of the stationary member 10, and is provided with a terminal 36 connected to an external source of electrical power supply, to a terminal of the main field exciting winding 17, and to a terminal of the starting field exciting winding 18. The other terminal of the starting field exciting winding is connected to a stationary electrical contact 37 secured to the insulating support 35. The other terminal of the main field exciting winding is connected to a terminal 38 secured to the support 35 and to the external source of electrical power supply. A substantially U-shaped mounting member having a base portion 39 secured to the support 35 is provided with a pair of arms 40 extending therefrom in spaced relation on opposite sides of the shaft 12. A flexible element 41 is secured to the base of the mounting member 39 through a resilient arm 42 in any suitable manner, as by spot welding, at 43, and is provided with two arms 44 extending therefrom in spaced relation on opposite sides of the shaft 12. The arms 44 of the flexible element 41 extend in the same direction as the arms 40 of the mounting member, and cushioning pads 45, made of felt or some similar material, are secured to the free ends of the arms 44. An electrical contact 46 is rigidly secured to the element 41, and is movably and resiliently secured thereby to the mounting member 39. This movable contact 46 is arranged in alignment and normally resiliently biased out of contact with the stationary electrical contact 37 by the arm 42 of the flexible element 41. The ends of the arms 40 engage the outer edge of the cushioning pads 45, forming stops to limit the normal biased out-of-contact position of the electrical contact 46, as shown in Fig. 3. Any suitable switch or circuit controlling device may be used to control the starting field exciting winding circuit. The switch above described is not my invention, but is the invention of Wayne J. Morrill and Carl P. Pepper, and is described and claimed in their copending application, Serial No. 144,673, filed May 25, 1937, and assigned to the General Electric Company, assignee of this application.

The position of the switch shown in Fig. 3 illustrates the arrangement of the centrifugal weights of the speed responsive mechanism and the open position of the contacts 37 and 46 when the dynamo-electric machine is operated at its normal speed. When the dynamo-electric machine is at rest, the force of the springs 31 upon the weights 20 causes these weights to pivot about the inner ends of the projections 28 in the slots 29, and thus move the collar 27 axially along the shaft 12 away from the rotatable member 11, bringing the sides of the arms 26 into engagement with each other. In this manner, the annular flange 34 of the collar 29 moves axially on the shaft 12 and engages the inner edge of the cushioning pads 45, thereby flexing the resilient element 41 and engaging the electrical contacts 37 and 46, as shown in Fig. 1. This completes the electrical circuit between the terminal 36, the starting winding 18, the contacts 37 and 46, to the electric terminal 38. In this manner, whenever the dynamo-electric machine is at rest, or operating below a predetermined speed, the circuit of the starting winding 18 is completed through the contacts 37 and 46, and whenever the machine attains a predetermined speed, these contacts are disengaged, and the circuit of the starting winding 18 is opened, it being understood that the main field exciting winding 17 remains energized during starting and running of the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A centrifugal switch including an axially movable collar having slots therein, outwardly movable weights having rigid arms extending angularly therefrom and pivotally engaging the slots in said collar, rigid fingers extending angularly from said weights in substantially the same direction as said arms, means including springs engaging said fingers for resisting outward movement of said weights and for providing resisting forces decreasing in magnitude with outward movement of said weights, and a circuit controlling device actuated by said collar.

2. A centrifugal switch including an axially movable collar, outwardly movable weights having rigid arms extending therefrom arranged to support said weights on said collar, rigid fingers extending from said weights in substantially the same direction as said arms, tension springs engaging said fingers and arranged to resist outward movement of said weights, means including a retainer plate having portions engaging said weights for guiding said weights, and a circuit controlling device arranged to be actuated by said collar.

3. A centrifugal switch including an axially movable collar having slots therein, outwardly movable weights having rigid arms extending angularly therefrom arranged to support said weights and pivotally engaging said slots in said collar, rigid fingers extending angularly from said weights in substantially the same direction as said arms, tension springs connecting said arms and arranged to resist outward movement of said weights, said weights having slots formed therein, means including a resilient retainer plate having portions engaging the slots in said weights for guiding said weights, and a circuit controlling device arranged to be actuated by said collar.

4. A centrifugal switch including an axially movable collar having slots therein, outwardly movable weights having rigid arms extending angularly therefrom pivotally engaging the slots in said collar, rigid fingers extending angularly from said weights and having notches formed in the outer ends thereof, tension springs engaging said notches and arranged to resist outward movement of said weights, said notches in said fingers being arranged to provide resultant resisting forces by said springs on said weights decreasing in magnitude with outward movement of said weights, and a circuit controlling device arranged to be actuated by said collar.

5. A centrifugal switch including an axially movable collar having slots therein, outwardly movable punched metal weights having rigid integral arms extending angularly therefrom and pivotally engaging the slots in said collar, means for resiliently retaining said weights in an inward position with the sides of said arms in engagement with each other, said weights being movable to an outward position under the action of centrifugal force in which said arms are spread apart angularly about the ends of said arms to move said collar, and a circuit controlling device arranged to be actuated by said collar.

ALFRED F. WELCH.